(12) United States Patent  
Neervoort

(10) Patent No.: US 7,689,934 B2  
(45) Date of Patent: Mar. 30, 2010

(54) METHOD OF SCROLLING THROUGH A DOCUMENT

(75) Inventor: Paulus Cornelis Neervoort, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 616 days.

(21) Appl. No.: 10/567,213

(22) PCT Filed: Jul. 30, 2004

(86) PCT No.: PCT/IB2004/051343

§ 371 (c)(1),  
(2), (4) Date: Feb. 3, 2006

(87) PCT Pub. No.: WO2005/015380

PCT Pub. Date: Feb. 17, 2005

(65) Prior Publication Data

US 2008/0235616 A1    Sep. 25, 2008

(30) Foreign Application Priority Data

Aug. 8, 2003    (EP)    ................... 03102484

(51) Int. Cl.  
*G06F 15/00*    (2006.01)  
*G06F 13/00*    (2006.01)
(52) U.S. Cl. ...................................... 715/847; 715/701
(58) Field of Classification Search ................. 715/203, 715/701, 243–244, 255, 847, 854; 345/440, 345/619  
See application file for complete search history.

(56) References Cited

U.S. PATENT DOCUMENTS

| 6,407,749 | B1 | 6/2002 | Duke |
| 2001/0030667 | A1* | 10/2001 | Kelts ........................... 345/854 |
| 2004/0140984 | A1* | 7/2004 | Hinckley et al. ............ 345/684 |

\* cited by examiner

*Primary Examiner*—Cao (Kevin) Nguyen

(57) ABSTRACT

The invention relates to a data processing system enabling a user to view or edit a document. When the user scrolls the document over a relatively large distance within a short time period, the system automatically adjusts the zoom factor so as to provide the user with a better overview during scrolling. When the user has finished scrolling, the zoom factor may be reinstated to its initial value.

9 Claims, 7 Drawing Sheets

METHOD OF SCROLLING THROUGH A DOCUMENT

FIELD OF THE INVENTION

The invention relates to a data processing system comprising presentation means for presenting at least a part of a document on a display screen, said part being determined by a position of a focal point within the document and by a zoom factor with respect to at least one coordinate direction, the system further comprising scroll means for adjusting the position of the focal point in response to a user-supplied scroll command.

The invention further relates to a method of scrolling through a document, comprising a step of presenting at least a part of the document on a display screen, said part being determined by a position of a focal point within the document and by a zoom factor with respect to at least one coordinate direction, the method further comprising a step of adjusting the position of the focal point in response to a user-supplied scroll command.

The invention further relates to a computer program product for implementing the above method.

BACKGROUND OF THE INVENTION

Scrolling and zooming are among the most frequently used commands in interactive applications such as word processors, spreadsheets and digital maps. This is because the full extent of the document is typically much larger than can be displayed by the display screen. To get an overview of the whole document, the user is likely to zoom-out to see a large part of the document at a glance, while operations such as editing and selecting typically require a zoomed-in view revealing detailed elements of the document which might be invisible or too small in the zoomed-out view.

An example of a system as defined in the opening paragraph is known from U.S. Pat. No. 6,407,749. The known system provides the user with user-operable means to easily switch between scrolling and zooming. This is, for example, achieved by operating two mouse buttons simultaneously, not requiring use of any on-screen graphic tools. The known system thus provides the user with a smooth flight-like aesthetic.

OBJECT AND SUMMARY OF THE INVENTION

It is an object of the invention to provide an improved system and method of the type defined in the opening paragraph. In one aspect of the invention, this object is realized in that the presentation means of the data processing system according to the invention is adapted to automatically adjust the zoom factor in dependence upon an aspect of said scroll command. Said aspect of said scroll command may include a duration, a repetition rate, or an intensity. For example, if the user quickly repeats a 'page-down' command, or holds the 'page-down' button for a longer period to generate a quick repetition of such commands, the system according to the invention may automatically adjust the zoom factor. Such an adjustment preferably comprises a zoom-out operation, so that a relatively large adjustment of the position of the focal point in a certain coordinate direction causes a zooming-out of said document in at least said coordinate direction, thus providing the user with a better impression of the effect of the scrolling operation.

The inventor has recognized that scrolling a document over a relatively large distance inherently involves a larger context than the context provided by a single screen in a zoomed-in view. In conventional systems, a prolonged actuation of a scroll-down button generally causes a large number of screens to be displayed in quick succession. This makes it difficult for the user to perceive the current position of the focal point and the speed of scrolling with respect to the entire document. In the system according to the invention, the presentation means may gradually or instantaneously zoom-out of the document, thus providing the user with a larger context for better understanding of the effect of the scrolling operation.

The presentation means are preferably adapted to reinstate the zoom factor when a predetermined period of time has lapsed since the scroll command. It is thus achieved that the user can directly proceed with making selections or amendments at a detailed level, without first zooming-in again on the location of the new focal point in the document. This reinstatement can be effected instantaneously or gradually so as to communicate the zooming-in to the user. The zooming-in may coincide with a centering of the focal point on the screen.

The document may be of any type, such as a text document, a spreadsheet, or database report. Zooming out may cause individual elements of the document, such as characters, cells, graphics etc. to become very small, or disappear at all, i.e. incorporated in a more generalized view. For example, instead of individual characters, entire paragraphs may be presented as single units. Clearly, for manipulating the individual characters, the zoom factor should be relatively large, while a smaller zoom factor is more suitable for getting a grand overview.

A specific example of a database document is an electronic program guide (EPG), where the individual elements are formed by the program items. In a detailed view, the programs may be represented by their title and possibly a genre icon, etc. The program items are often listed in accordance with their broadcast time, e.g. all programs scheduled to be broadcast on a certain channel are presented in a list which is sorted by time. Slowly scrolling the list along the time axis, i.e. advancing the focal point to future programs, will remove current items from the screen and show the titles and icons of the future programs. According to the invention, when the user quickly repeats a scroll command, the system will start zooming out, resulting in a denser view of the time axis, and necessitating a more compact view of program items, e.g. by icons only. Further zooming-out may represent programs by simple dots. Although the individual programs are then not recognizable anymore, such a representation may still be useful in combination with a recommender system, e.g. to discover clusters of recommended programs. When the user has not given scroll commands for a predetermined period of time, the system may reinstate the zoom factor to its default or maximum value again, possibly shifting the focal point to a nearest cluster of recommended programs first. Such a reinstatement may proceed in an animated way, to avoid disorientation with the user. Alternatively or additionally, the user may be provided with a control element by means of which the zoom factor can be reinstated at any desired moment.

The program items are possibly presented in a two-dimensional manner, e.g. a time-channel matrix, which means that, in addition to a time dimension, there is also a channel dimension. Scrolling through time in the manner described above may or may not adjust the zoom factor in the channel dimension. For document types, wherein the zoom factors of two dimensions are more connected, e.g. a digital map or a text document, the zoom factors are preferably adjusted simultaneously, either by substantially the same amount, in a certain mutual proportion, or with independent quantities.

In a further aspect, the object of the invention is realized in that the presentation step of the method according to the invention is adapted to automatically adjust the zoom factor in dependence upon an aspect of said scroll command.

BRIEF DESCRIPTION OF THE DRAWINGS

These and other aspects of the invention are apparent from and will be elucidated, by way of a non-limitative example, with reference to the embodiment(s) described hereinafter. Throughout the Figures, identical reference numerals indicate similar or corresponding features. Some of the features indicated in the drawings are typically implemented in software, and as such represent software entities, such as software modules or objects.

In the drawings.

DESCRIPTION OF EMBODIMENTS

Figure 1:
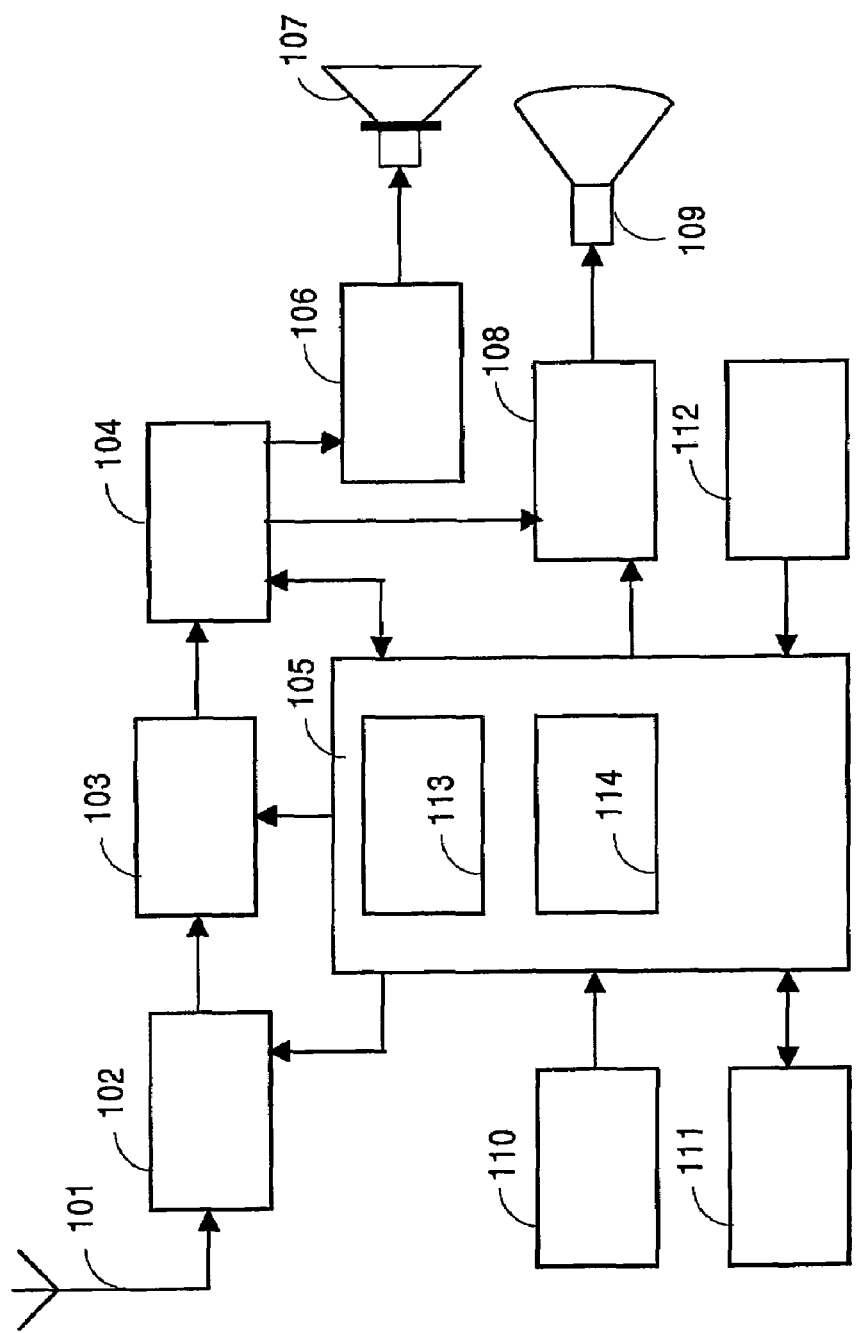
FIG. 1 is a block diagram of a digital television receiver as an embodiment of the data processing system according to the invention.

FIG. 1 is a block diagram of a digital television receiver as an embodiment of the data processing system according to the invention. Digital broadcast streams, modulated upon radio frequency (RF) signals, are received from the ether by an antenna 101 or, alternatively, from a cable network. The broadcast streams may be formatted, for example, in accordance with the Digital Video Broadcasting (DVB) standard. A tuner 102 comprises a standard analog RF receiving device which is capable of receiving said RF signals and selecting one of them to be output to a demodulator 103. Which signal tuner 102 selects is dependent upon control data received from a central processing unit (CPU) 105. The demodulator 103 converts the analog signal into a digital packet stream, based on control signals received from the CPU 105. This packet stream is then output to a demultiplexer 104, which selects packets belonging to a particular program in accordance with control data received from the CPU 105, and decomposes the packet stream into elementary video, audio or data streams.

In addition to broadcast signals, the television receiver may be adapted to receive signals from other sources too, for example, from a (digital) video recorder or DVD, from the Internet, or from a digital subscriber line. A video processor 108 decodes the video stream received from the demultiplexer 104 or from the CPU 105, and decoded video data is then transmitted to a display screen 109. An audio processor 106 decodes the audio stream received from the demultiplexer 104, and decoded audio data is then transmitted to a loudspeaker system 107.

The demultiplexer 104 outputs the elementary data stream to the CPU 105. The elementary data stream has two types of data: control data and content data. Content refers to, for example, interactive programs; control refers to tables in the multiplex which specify matters like the structure of the multiplex, the (RF) frequencies at which the channels are modulated, and the addresses at which the various content components and the (other) tables in the multiplex can be found. The CPU 105 comprises one or more microprocessors capable of executing program instructions stored in a read-only memory (ROM) 112. These program instructions comprise parts of software modules including, inter alia, a command module 113, and an EPG module 114. Data processed by said software modules, e.g. DVB-S1 data and user profile information, may be stored in a non-volatile memory 111. The command module 113 is capable of controlling functions of the TV-set, like tuning and demultiplexing selection, and transmitting data to the video processor 108 to be presented on the screen 109. A user command unit 110 receives user commands, e.g. through a remote control (not shown), and transmits them to the command module 113 to be processed. The EPG module 114 interprets the DVB-S1 data received from the demultiplexer 104 to collect information about the channels ('services' in DVB terminology) available in the received broadcast streams and about the programs ('events' in DVB terminology) scheduled for these channels.

Figure 2:
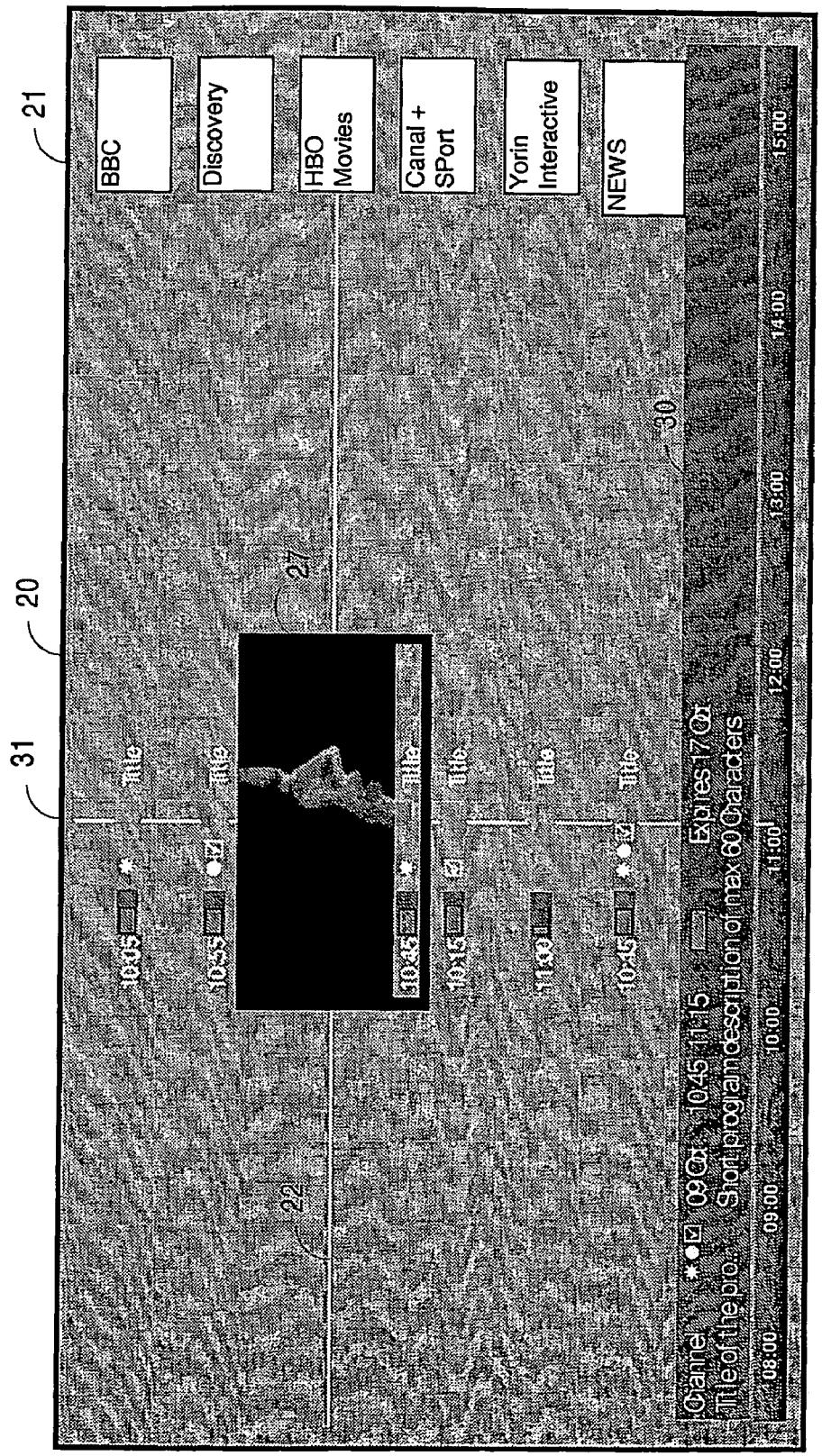
FIG. 2 shows an example of a screen representation of an EPG in accordance with an embodiment of the method according to the invention.

FIG. 2 shows an example of a screen representation of an EPG in accordance with an embodiment of the method according to the invention. Display screen 20 shows, after a suitable user command for starting the EPG application, a vertical axis 21, along which names of channels are displayed, and a horizontal axis 30, represented as a time bar representing the broadcast time. Clock times corresponding to one-hour intervals are shown along the axis 30. The system may comprise means (not shown) for relocating the axes to another position, and/or changing their orientation. A pictogram 27 is adapted to present information, such as a picture frame, related to a program which corresponds to the selected time and channel. The correspondence between the pictogram 27 and the selected time and channel is emphasized by lines 22 and 31 which together form a cross hair. Additional information about the selected program is shown along the time bar 30, for example, the title, the channel name, broadcast time, and a short description. The information presented in the pictogram 27 and along the time bar is transmitted, for example, along with the DVB-S1 data and stored in the memory 111. Said information may comprise, inter alia, text, graphics, pictures, sound and video clips. The memory 11 may comprise, for example, solid-state memory, and/or magnetic or optical storage.

Information about programs which are scheduled to be broadcast on other channels at the selected time is displayed along the channel axis 31. This information may include start-time, elapsed time with respect to the currently selected time, title, etc.

Pictogram 27 is a focal point within the schedule information provided by the EPG, i.e. it indicates a currently selected combination of time and channel, and uniquely defines a particular program schedule element. The schedule information as provided by the EPG at a certain moment, often a period of two weeks, constitutes a document which the user can scroll through by adjusting the position of the focal point. To that end, the pictogram 27 can be dragged by the user by means of the command unit 110, for example, by pressing 'cursor' keys (up/down/left/right) on a remote control, or any other well-known manner of controlling a (cursor) position on a display. Dragging the pictogram 27 in the horizontal direction has the effect that the selected broadcast time shifts to the future or the past, dependent on the direction. It causes the content of pictogram 27 and the additional information along bar 30 to be replaced by information pertaining to a program corresponding to the newly selected time on the same channel. Also the information about programs on the other channels along axis 21 is updated. Dragging the pictogram 27 in the vertical direction causes the selected channel to be adjusted and at least some of said data elements on the screen to be updated accordingly.

When the user is interested in a program corresponding to the information presented in the pictogram 27, he may be allowed to select said program for recording, immediate viewing or setting a reminder. The selection of said program may be achieved by issuing a suitable command, for example, by means of a dedicated button (not shown) on the user command unit 10, an on-screen menu, or voice recognition.

Figure 3:
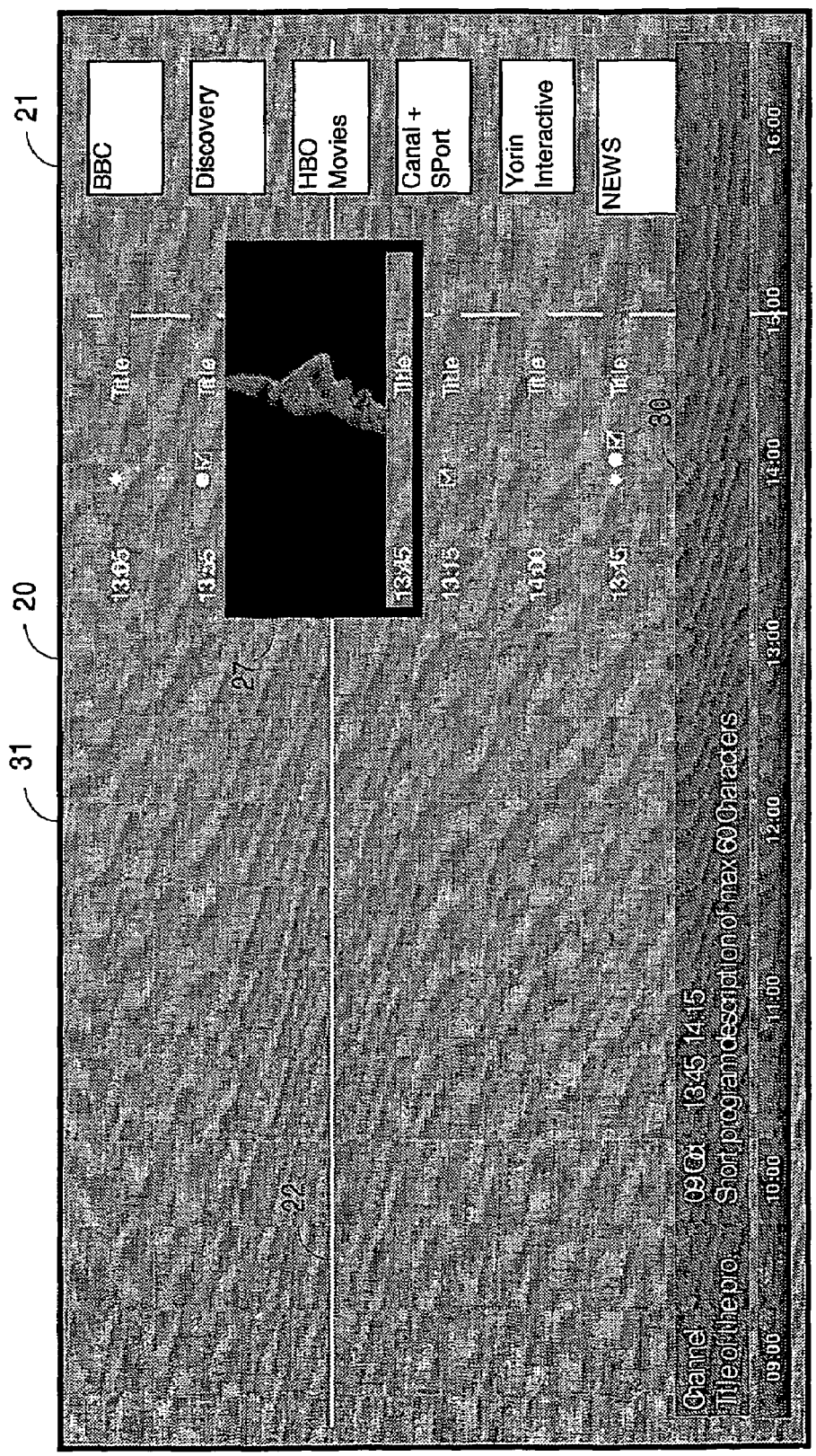
FIG. 3 shows an example of the screen when the user presses the cursor-right key when it is at the edge of the screen.

After a number of scroll commands have been given, pictogram 27 will have reached the edge of the screen at a certain moment. If the user continues scrolling in the same direction, the range of time represented by time bar 30 will start shifting, while pictogram 27 remains in the same position. This is depicted in FIG. 3. The time-bar gets updated to indicate the movement into the future. The steps at which the time-bar is updated changes to time-based jumps rather than "next program" jumps.

Figure 4:
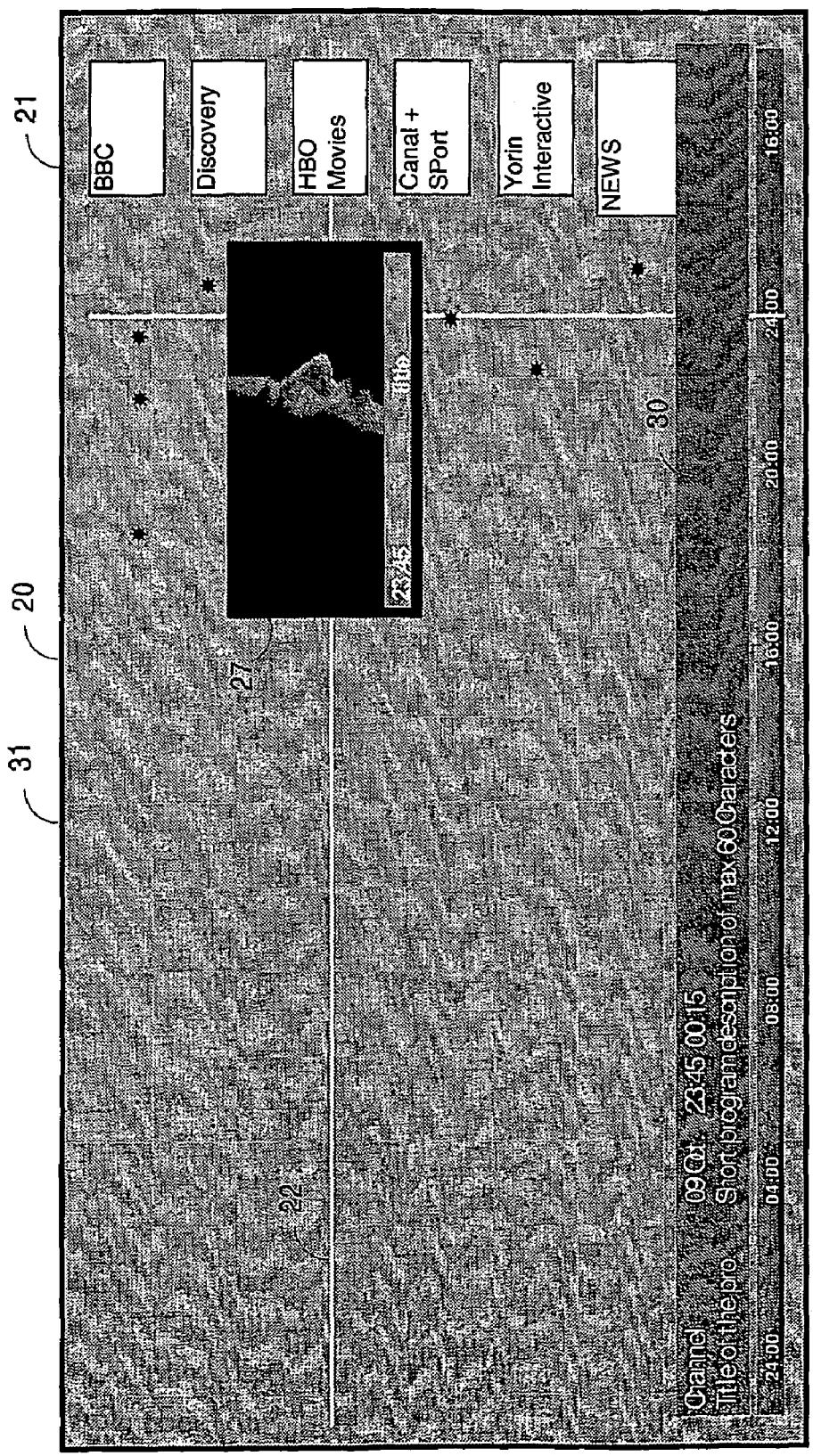
FIG. 4 shows an example of the screen when the user keeps pressing the cursor-right key for a longer period when it is at the edge of the screen.

FIG. 4 shows an example of the screen when the user keeps pressing the cursor-right key for a longer period while it is at the edge of the screen (e.g. 1.5 seconds). The pictogram 27 remains but all other program information is "reduced" to symbols which indicate a recommended program or an otherwise tagged program. Also the scale of time bar 30 is being adjusted to increase with larger steps.

Figure 5:
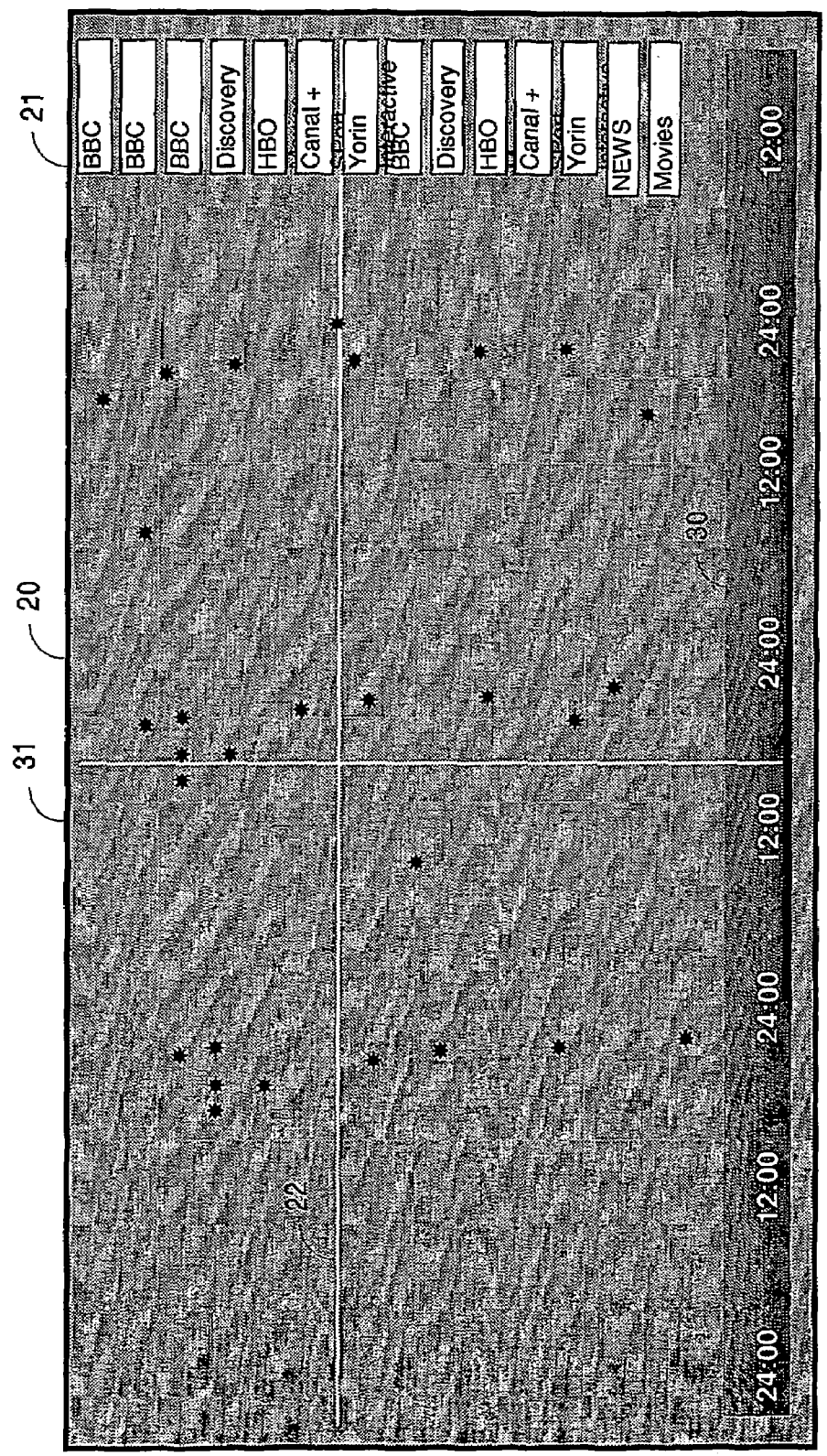
FIG. 5 shows an example of the screen when the user has kept the cursor-right key pressed for a longer period.

FIG. 5 shows an example of the screen when the user has kept the cursor-right key pressed for a longer period. Pictogram 27 has disappeared and the cross-hair position has moved to the center and the scale of the time bar as well as the channels is zooming out. The effect is that the program overview becomes a "star system" allowing the user to recognize the most interesting programs. When no further scroll commands are given, the cross hair will be automatically drawn to the nearest and largest cluster of "stars" ("gravity" principle) thus ensuring that the user will see the "best selection". In alternative embodiments, the cross hair is not centered, and/or zooming out is only performed in the time dimension.

Figure 6:
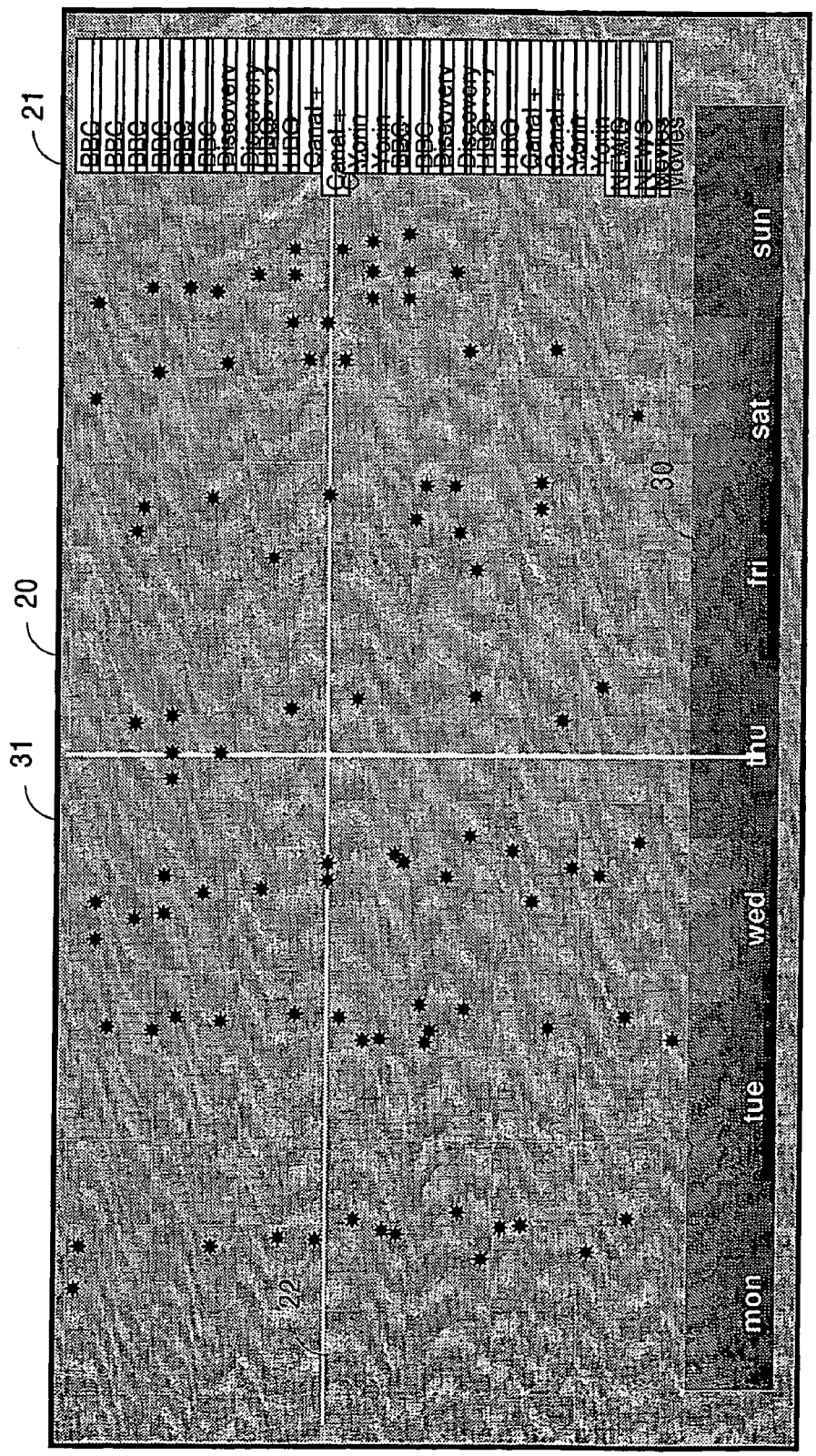
FIG. 6 shows an example of the screen when the view is completely zoomed out.

FIG. 6 shows an example of the screen when the view is completely zoomed out. The steps on the time bar are now per day. The view includes all available channels. The effect is that the program overview becomes a "star universe" allowing the user to have an overview of all interesting programs. When no further scroll commands are given, the cross hair will be automatically drawn to the nearest and largest cluster of "stars", thus ensuring that the user will see the "best selection".

After another period of time, during which no further scroll commands are given, the cross hair may continue to zoom in on the cluster until the most likely candidate is found. This is based on several criteria, including currently watched channel, highest ranking program, etc.

While zooming out, the user can again initiate navigation within the screen to influence the selection, for example, by moving the cross hair up or down to select a particular channel or region of channels.

Figure 7:
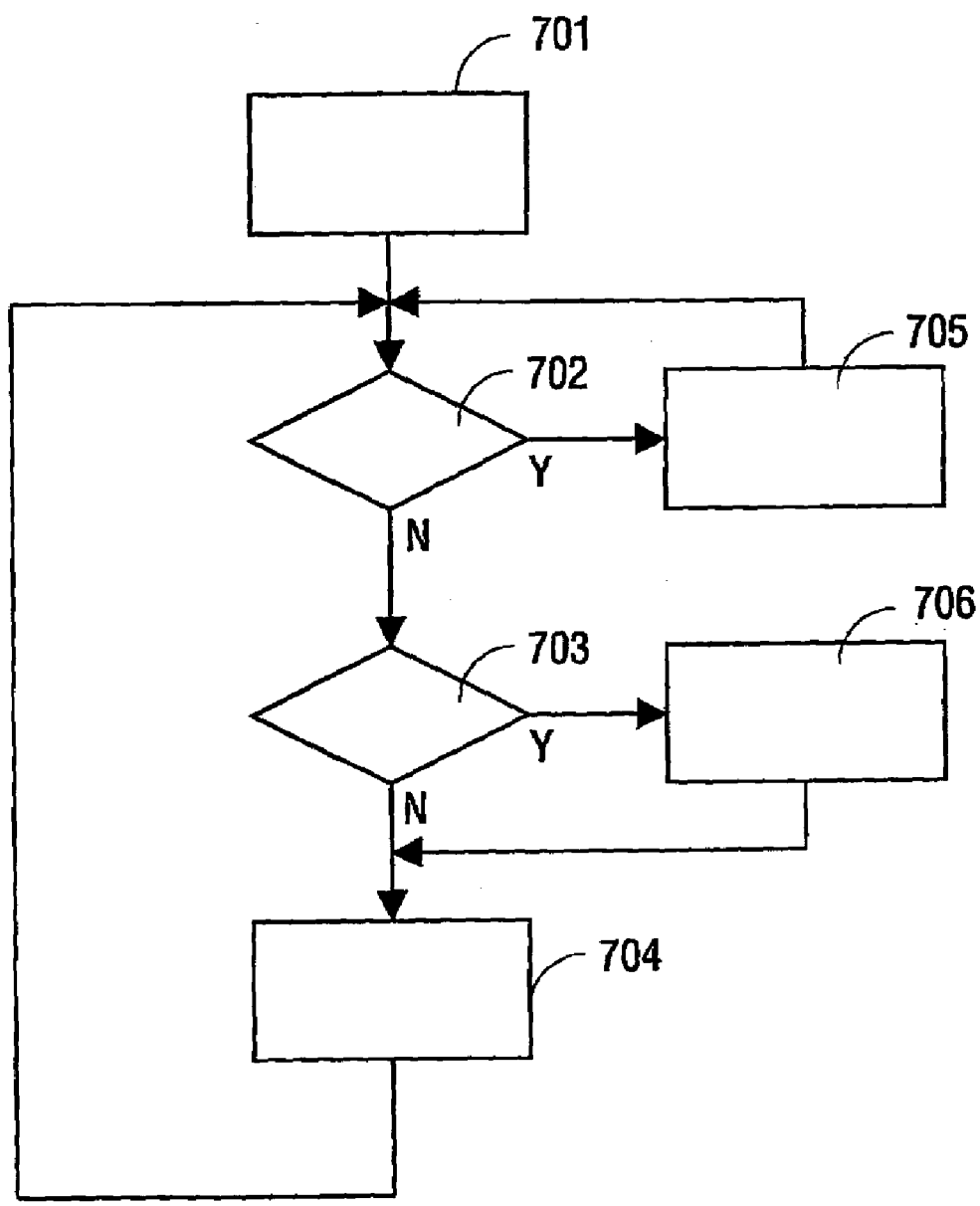
FIG. 7 is a flow chart of a method of scrolling a document according to the invention.

FIG. 7 is a flow chart of a method of scrolling a document according to the invention. After an initialization step 701, the system awaits scroll commands in a step 702. If a certain amount of time has passed since the last scroll command, step 705 is performed as will be explained hereinafter. In step 703, it is determined whether an aspect of the scroll command meets certain criteria Examples of such an aspect are the duration of the command, the time period since the previous scroll command, a force exerted on a force-sensitive input device, etc. The corresponding criteria may include the duration exceeding a threshold value, the time period since the previous scroll command being less than a threshold value, or the exerted force exceeding a threshold value, respectively. If these criteria are met, a step 706 is performed. In step 706, the zoom factor is diminished, i.e. the system zooms out of the document. This zooming-out may proceed instantaneously or gradually. For example, in response to a quick repetition of scroll commands, the zoom factor may be diminished with a fixed amount or percentage after each command. Alternatively, in response to a prolonged operation of a scroll button, the zoom factor may be diminished gradually while the user keeps operating the button. In yet another embodiment, the zoom factor is made a function of the exerted force on a force-sensitive input device. Irrespective of the outcome of test 703, the scroll command is performed in the normal manner in step 704. If the zoom factor is minimized, this means that the entire document is presented on a single screen, and that the scrolling only involves moving the focal point, e.g. cursor or cross hair, across the screen until it reaches a beginning or end of the document, while the document is statically displayed.

If it is determined in step 702 that a certain amount of time has passed since the last scroll command and if the zoom factor was earlier diminished automatically as described above, the zoom factor is automatically increased again in step 705, causing a zooming-in on the document. This zooming-in may be instantaneous or animated to avoid confusion with the user. The automatic increasing action may stop when the original zoom factor is reached, or it may be stopped at a predetermined default value. Prior to this automatic reinstatement of the zoom factor, the focal point may be centered on the screen to some extent in order to ensure that the focal point is still visible after zooming in, and optionally the focal point may be automatically adjusted to a more relevant part of the document near the current focal point. This relevance may be determined by a recommender system, or by simple rules, e.g. if the focal point is in an empty part of the document after scrolling for some time, the focal point may be relocated to the closest non-empty part, e.g. text paragraph.

In summary, the invention relates to a data processing system enabling a user to view or edit a document. When the user scrolls through the document over a relatively large distance within a short time period, the system automatically adjusts the zoom factor so as to provide the user with a better overview during scrolling. When the user has finished scrolling, the zoom factor may be reinstated to its initial value.

Although the invention has been described with reference to particular illustrative embodiments, variants and modifications are possible within the scope of the inventive concept. Thus, for example, the invention can be applied to any type of document, such as text documents, digital maps, etc. Furthermore, any type of input device may be used, such as cursor control keys, mouse, trackball, joystick, voice control, etc. In all cases, if the system can deduce that the user intends to scroll, or is in the process of scrolling the document over a relatively large distance, the automatic adjustment of the zoom factor according to the invention may be applied.

The use of the verb 'to comprise' and its conjugations does not exclude the presence of elements or steps other than those defined in a claim. In the claims, any reference signs placed between parentheses shall not be construed as limiting the claim. The invention can be implemented by means of hardware comprising several distinct elements, and by means of a suitably programmed computer. In the system claims enumerating several means, several of these means can be embodied by one and the same item of hardware.

A 'computer program' is to be understood to mean any software product stored on a computer-readable medium, such as a floppy-disk, downloadable via a network, such as the Internet, or marketable in any other manner.

The invention claimed is:

1. A system for scrolling through a document, comprising:
   presentation means for presenting at least a part of a document on a display screen, said part being determined by a position of a focal point within the document and by a zoom factor with respect to at least one coordinate direction,
   the presentation means being capable of adjusting the position of the focal point in response to a user-supplied scroll command,
   said presentation means being adapted to automatically adjust the zoom factor (i) in dependence upon an aspect of said scroll command and (ii) when the focal point approaches an edge of the display screen and remains on the edge of the display screen for a predetermined period of time, wherein a relatively large adjustment of the position of the focal point in a certain coordinate direction causes a zooming-out of said document in at least said coordinate direction.

2. The system as claimed in claim 1, wherein said aspect of said scroll command includes at least one of a duration, a repetition rate, or an intensity.

3. The system as claimed in claim 1, wherein the presentation means are adapted to reinstate the zoom factor when a predetermined period of time has lapsed since the scroll command.

4. The system for scrolling through a document as claimed in claim 1, wherein the automatic adjustment of the zoom factor proceeds gradually.

5. A computer program product enabling a programmable device, when executing said computer program product, to function as a system for scrolling through a document as defined in claim 1.

6. A method of scrolling through a document, comprising;
   a presentation step of presenting at least a part of the document on a display screen by a processing unit, said part being determined by a position of a focal point within the document and by a zoom factor with respect to at least one coordinate direction,
   the method further comprising a step of:
   adjusting the position of the focal point in response to a user-supplied scroll command, said presentation step being adapted to automatically adjust the zoom factor (i) in dependence upon an aspect of said scroll command and (ii) when the focal point approaches an edge of the display screen and remains on the edge of the display screen for a predetermined period of time, wherein a relatively large adjustment of the position of the focal point in a certain coordinate direction causes a zooming-out of said document in at least said coordinate direction.

7. The method as claimed in claim 6, wherein said aspect of said scroll command includes at least one of a duration, a repetition rate, or an intensity.

8. The method as claimed in claim 6, wherein the presentation step is adapted to reinstate the zoom factor when a predetermined period of time has lapsed since the scroll command.

9. The method as claimed in claim 6, wherein the automatic adjustment of the zoom factor proceeds gradually.

* * * * *